(12) United States Patent
Grubb et al.

(10) Patent No.: US 6,344,922 B1
(45) Date of Patent: Feb. 5, 2002

(54) OPTICAL SIGNAL VARYING DEVICES

(75) Inventors: Stephen G. Grubb; Raymond Zanoni; Thomas D. Stephens; Deepak Boggavarapu, all of Columbia; Ruxiang Jin, Ellicott City, all of MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/253,819

(22) Filed: Feb. 19, 1999

Related U.S. Application Data

(63) Continuation-in-part of application No. 09/119,556, filed on Jul. 21, 1998, now Pat. No. 6,115,174.

(51) Int. Cl.[7] ................................................. H01S 3/00
(52) U.S. Cl. ................... 359/334; 359/134; 359/341.31
(58) Field of Search ................................. 359/118, 124, 359/134, 160, 337, 341, 334, 341.31

(56) References Cited

U.S. PATENT DOCUMENTS

| | | |
|---|---|---|
| 4,315,666 A | 2/1982 | Hicks, Jr. |
| 4,342,499 A | 8/1982 | Hicks, Jr. |
| 4,401,364 A | 8/1983 | Mochizuki |
| 4,616,898 A | 10/1986 | Hicks, Jr. |
| 4,699,452 A * | 10/1987 | Mollenauer et al. ........ 359/334 |
| 4,728,170 A | 3/1988 | Robertson |

(List continued on next page.)

FOREIGN PATENT DOCUMENTS

| | | |
|---|---|---|
| EP | 0 734 105 A2 | 9/1996 |
| EP | 0734105 * | 9/1996 |
| JP | 7202306 A | 8/1995 |
| JP | 7-202306 * | 8/1995 |
| WO | 98/42088 * | 9/1998 |
| WO | WO 98/42088 | 9/1998 |

OTHER PUBLICATIONS

Park, S.Y., et al., Feasibility Demonstration Of 10 Gbit/s Channel WDM Network Using Dynamic Gain–Controlled EDFAs, Electronics Letters, 5th Mar. 1998, vol. 34, No. 5., Online No. 19980346.

Dung, J.C., et al., Gain Flattening Of Erbium Doped Fibre Amplifier Using Fibre Bragg Gratings, Electronics Letters, 19th Mar. 1998, vol. 34, No. 6., Online No. 19980446.

Masuda, H., et al., Ultra–Wideband Optical Amplification With a 3–Db Bandwidth Of 67 nm Using a Partially Gain Flattened Erbium–Doped Fiber Amplifier and Raman Amplification, Optical Amplifiers and their Application, Aug. 3–5, 1994, 1997 OSA Technical Digest Series, V20, pp. MC3–1–4/40–3.

(List continued on next page.)

*Primary Examiner*—Nelson Moskowitz

(57) ABSTRACT

Optical systems of the present invention include a plurality of optical processing nodes in optical communication via at least one signal varying device. The signal varying devices includes an optical fiber suitable for facilitating Raman scattering/gain in a signal wavelength range and a pump energy source for providing pump energy in a plurality of pump wavelengths. The pump source provides sufficient pump energy in each pump wavelength to stimulate Raman scattering/gain in the optical fiber within the signal wavelength range. The pump wavelengths are selected such that the combined Raman gain resulting from the pump energy supplied by each pump wavelength produces a desired signal variation profile in the signal wavelength range. In addition, the pump energy supplied by at least one of the pump wavelengths can be varied to produce a controlled signal intensity variation profile over the signal wavelength range in the optical fiber.

33 Claims, 11 Drawing Sheets

U.S. PATENT DOCUMENTS

| | | | |
|---|---|---|---|
| 4,805,977 A | * | 2/1989 | Tamura et al. ............... 359/334 |
| 4,881,790 A | | 11/1989 | Mollenauer |
| 5,039,199 A | | 8/1991 | Mollenauer et al. |
| 5,083,874 A | | 1/1992 | Aida et al. |
| 5,095,519 A | | 3/1992 | Dorsey |
| 5,191,628 A | * | 3/1993 | Byron ......................... 359/134 |
| 5,228,105 A | * | 7/1993 | Glista ........................... 385/89 |
| 5,406,411 A | | 4/1995 | Button et al. |
| 5,541,766 A | | 7/1996 | Mizrahi et al. |
| 5,557,442 A | | 9/1996 | Huber |
| 5,633,974 A | | 5/1997 | Chia |
| 5,636,301 A | | 6/1997 | O'Sullivan et al. |
| 5,651,085 A | | 7/1997 | Chia |
| 5,694,512 A | | 12/1997 | Gonthier et al. |
| 5,696,615 A | | 12/1997 | Alexander |
| 5,883,736 A | | 3/1999 | Oshima et al. ............. 359/341 |
| 5,920,423 A | | 7/1999 | Grubb et al. |
| 5,963,361 A | | 10/1999 | Taylor et al. ............... 359/337 |
| 5,999,548 A | | 12/1999 | Mori et al. .................... 372/22 |
| 6,031,646 A | | 2/2000 | Sniadower |
| 6,055,092 A | | 4/2000 | Sugaya et al. |
| 6,057,959 A | | 5/2000 | Taylor et al. |
| 6,081,366 A | * | 6/2000 | Kidorf et al. ............... 359/241 |
| 6,122,298 A | | 9/2000 | Kerfoot, III et al. |

OTHER PUBLICATIONS

Sugaya, Y., et al., Novel Configuration For Low–Noise And Wide–Dynamic–Range Er–Doped Fiber Amplifiers For WDM Systems, Optical Amplifiers and their Application, Jun. 15–17, 1995, 1995 OSA Technical Digest Series, V18, pp. FC3–1–4/158–161.

Jacobovitz–Veselka, G.R., et al., Single–Stage Booster Amplifier With Two 980 nm Pumps Stabilized By Fiber Gratings, Optical Amplifiers and their Application, Jun. 15–17, 1995, 1995 OSA Technical Digest Series, V18, pp. FC4–1–4/162–165.

Hansen, P.B., et al., Loss Compensation In Dispersion Compensating Fiber Modules by Raman Amplification, OFC' 98 Technical Digest pp. 20–21.

Rottwitt, K., et al., Detailed Analysis of Raman Amplifiers For Long–Haul Transmission, OFC' 98 Technical Digest pp. 30–31.

Chernikov, S.V., et al., 10 Gbit/s Error–Free Transmission of 2–ps Pulses Over a 45–km Span Using Distributed Raman Amplification at 1300 nm, OFC' 98 Technical Digest p. 31.

Kawai, S., et al., Ultrawide 75 nm 3–dB Gain–Band Optical Amplifier Utilizing Erbium–Doped Fluoride Fiber And Raman Fiber, OFC' 98 Technical Digest pp. 32–33.

Dianov, E.M., et al., Highly Efficient 1.3 $\mu$m Raman Amplifier, OFC' 98 Technical Digest pp. 33–34.

Rottwitt, K., et al., A 92 nm Bandwidth Raman Amplifier, OFC' 98, Post–Deadline Paper PD6–1–4.

Srivastava, A. K., et al., 1 Tb/s Transmission Of 100 WDM 10 Gb/s Channels Over 400 km of TrueWave Fiber, OFC' 98, Post–Deadline Paper PD10–1–4.

Masuda, H., et al., Ultra–Wideband Hybrid Amplifier Comprising Distributed Raman Amplifier And Erbium–Doped Fiber Amplifier, Electronics Letters, $25^{th}$ Jun. 1998, vol. 34, No. 13, Online No. 19980935.

Takano K., et al, An Optical Pre–Amplifier With Automatic Gain Control Function, Proceedings of the 1995 IEICE General Conference, Mar. 27–30, 1995, Fukuoka, Fukuoka Institute of Technology b–1067, p. 513.

Stentz, Andrew, et al., Analog–Grade Power Raman Ring Amplifier at 1.3 um, OSA Trends in Optics and Photonics, vol. 5, Optical Amplifiers and Their Applications. From the Topical Meeting, pp. 350–368, Published: Washington, DC, USA, Jul. 13, 1996.

Aida, K., et al., Long–Span Repeaterless IM/DD Optical Transmission Experiment over 300 KM using Optical Amplifies, ICC '91, vol. 3, pp. 1228–1232, 1991, Published: New York, NY, USA.

Zou et al., IEEE Photonics Technology Letters, v8, n1, pp. 139–141 (1/96).

Grubb, OFC 98 Technical Digest Series, v2, (abstract only).

Masuda et al, Electronics letters, vol. 341 #13, pp. 1–2, Jun. 25, 1998.*

Stentz et al, DAS Trends in Optics and Photonics, vol. 5, pp. 350–368, Jul. 13, 1996.*

Wen et al, IEEE Photonics Tech. Letters, #4, pp. 189–192, Feb. 1992.*

Masuda et al, Electronics Letters, vol. 341 #13, pp. 2, Jun. 25, 1998.*

* cited by examiner

Fig. 8
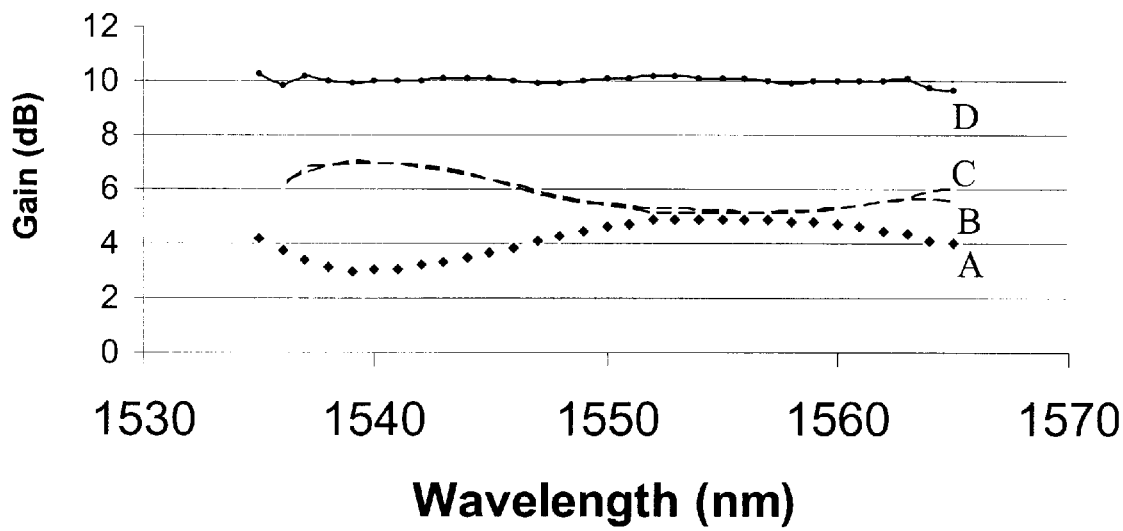
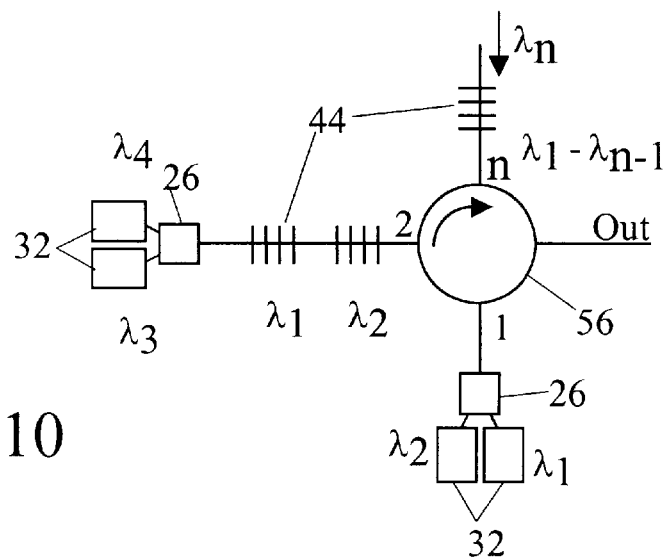
Fig. 10

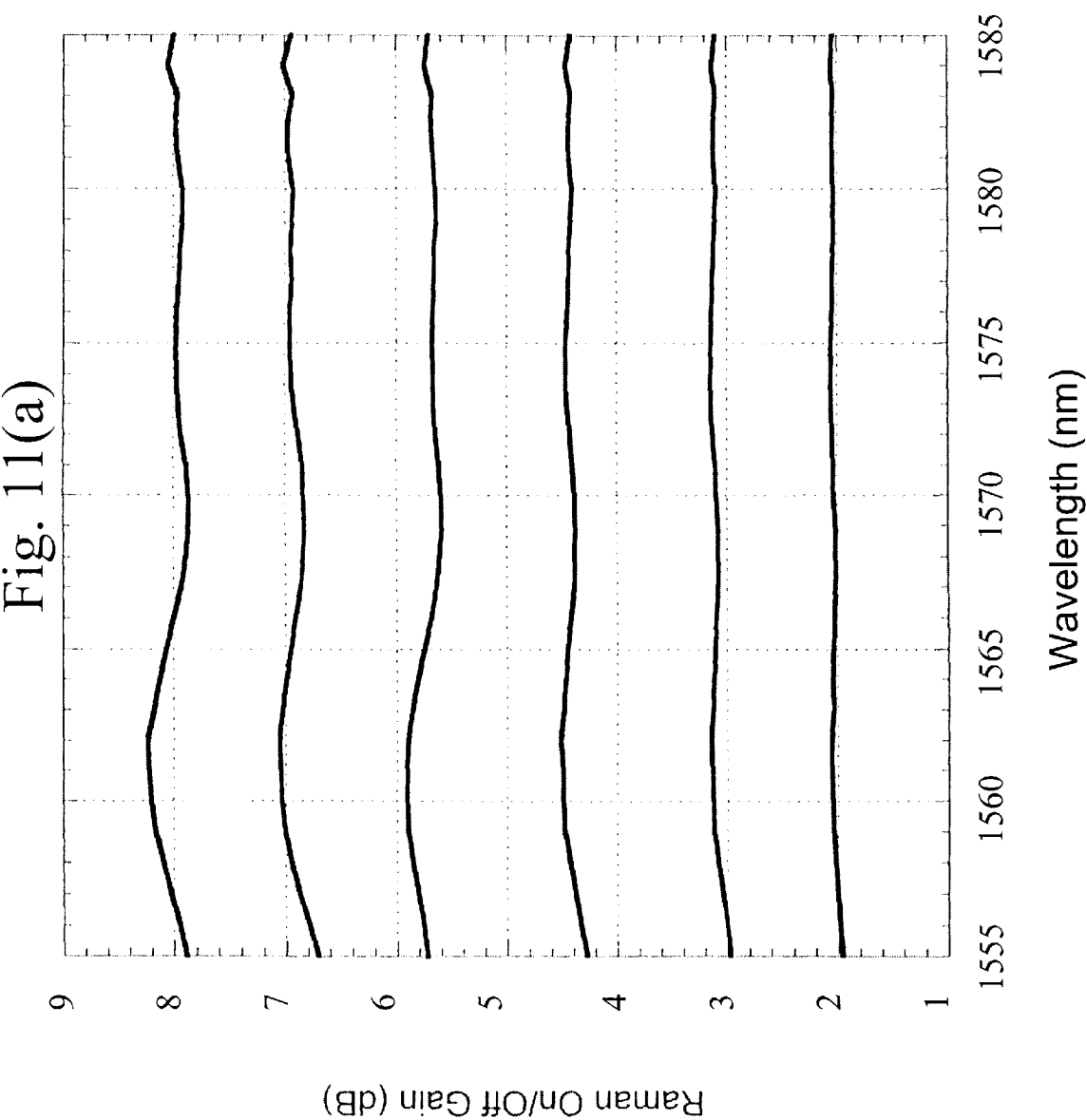

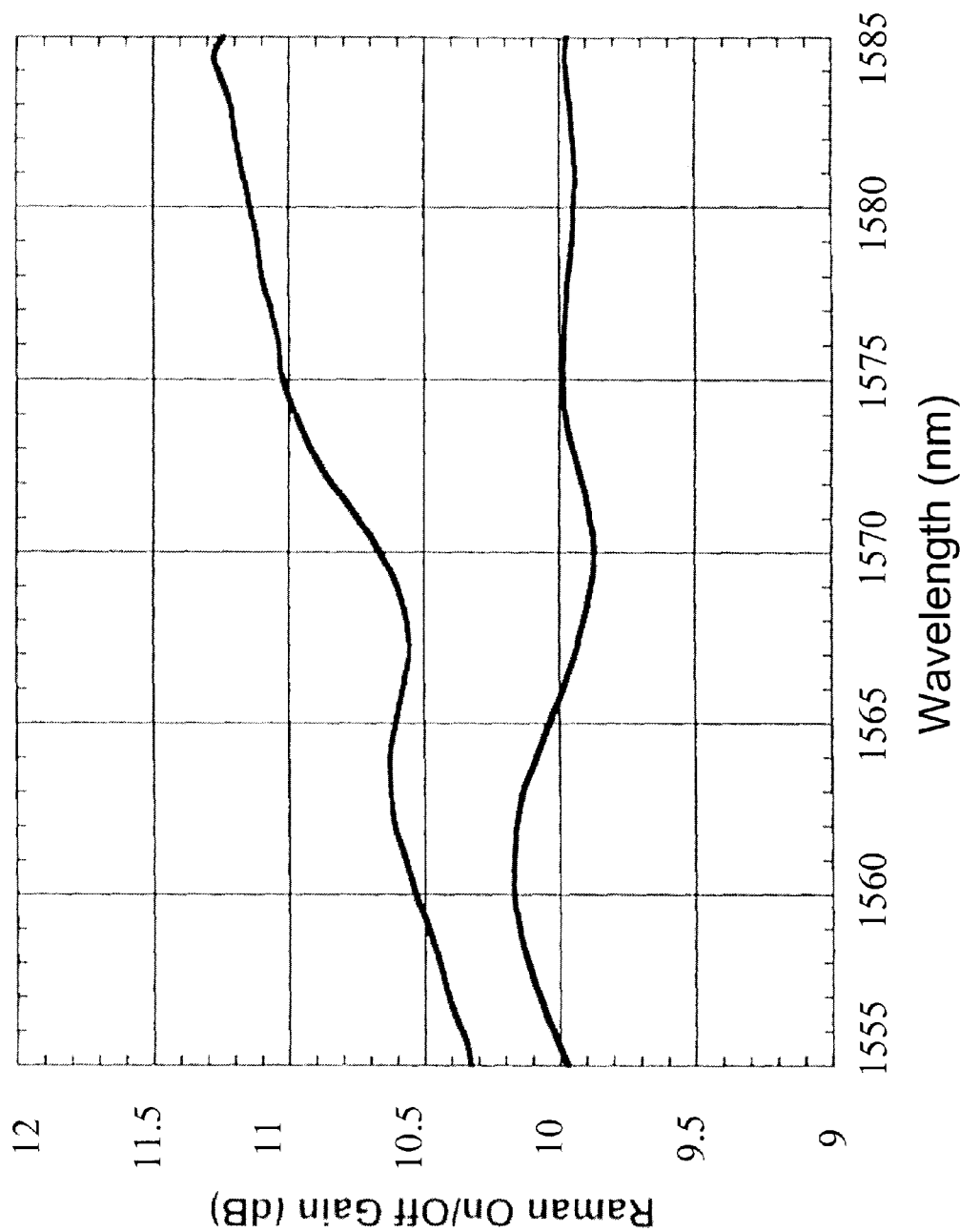

OPTICAL SIGNAL VARYING DEVICES

CROSS-REFERENCE TO RELATED APPLICATIONS

This application is a continuation in part of commonly assigned U.S. Ser. No. 09/119,556 filed Jul. 21, 1998 entitled "Optical Signal Varying Devices", now U.S. Pat. No. 6,115,111 which is incorporated herein by reference.

STATEMENT REGARDING FEDERALLY SPONSORED RESEARCH OR DEVELOPMENT

Not Applicable

BACKGROUND OF THE INVENTION

The present invention is directed generally to optical signal varying devices that provide for controllably varying optical signal characteristics. More particularly, the invention relates to optical amplifiers and attenuators that have controllable gain, loss and transparent intensity variation profiles for use in optical communication systems.

The continued development of digital technology has provided electronic access to vast amounts of information. The increased access to information has fueled an increasing desire to quickly obtain and process the information. This desire has, in turn, driven demand for faster and higher capacity electronic information processing equipment (computers) and transmission networks and systems linking the processing equipment (telephone lines, cable television (CATV) systems, local, wide and metropolitan area networks (LAN, WAN, and MAN)).

In response to this demand, telecommunications companies have turned to optical communication systems to provide substantially larger information bandwidth transmission capacities than traditional electrical communication systems. Early optical transmission systems, known as space division multiplex (SDM) systems, transmitted one information signal using a single wavelength in separate waveguides, i.e. fiber optic strand. Time division multiplexing (TDM) multiple information signals onto a single wavelength in a known sequence that can be separated upon receipt has further increased the transmission capacity of optical systems.

The continued growth in traditional communications systems and the emergence of the Internet as a means for accessing data has further accelerated the demand for higher capacity communications networks. Telecommunications companies have looked to wavelength division multiplexing (WDM) to further increase the capacity of their existing systems.

In WDM transmission systems, pluralities of distinct TDM or SDM information signals are carried using electromagnetic waves having different wavelengths in the optical spectrum, i.e., far-UV to far-infrared. The pluralities of information carrying wavelengths are combined into a multiple wavelength optical signal, which is transmitted in a single waveguide. In this manner, WDM systems can increase the transmission capacity of existing SDM/TDM systems by a factor equal to the number of wavelengths used in the WDM system.

Optical WDM systems were not initially deployed, in part, because of the high cost of electrical signal regeneration/amplification equipment required to compensate for signal attenuation for each optical wavelength throughout the system. However, the development of the erbium doped fiber optical amplifier (EDFA) eliminated the need for, and the associated costs of, electrical signal regeneration/amplification equipment to compensate for signal attenuation in many systems. Thus, WDM systems became a cost effective means to increase optical network capacity.

Erbium doped fiber amplifiers ("EDFAs") can theoretically be used to amplify signals in an amplification wavelength range spanning from approximately 1500 nm and 1600 nm. However, EDFAs do not equally amplify each optical signal wavelength within the range. The differences in amplification can result in attenuation of some signals and/or signal loss or distortion because of highly amplified noise. Thus, the performance of EDFAs in a transmission system varies depending upon the number of wavelengths and the wavelengths used in the system.

Judicious selection of the wavelengths and amplifier powers used in a system can minimize EDFA variations (gain non-uniformities). For example, many WDM systems currently restrict the wavelengths used in the system to between 1540 nm and 1560 nm, a range in which EDFAs comparably amplify optical signals. As might be expected, restricting system designs to only those wavelengths that are comparably amplified by EDFAs severely limits the number of wavelengths and the information transmission capacity of WDM systems.

The number of wavelengths in the system can be increased to some extent, if only a small number of amplifiers are used in the system. A broader range of wavelengths can be used with a less stringent requirement for uniform amplification, because cumulative amplifier variations will generally not swamp out lowly amplified signals over a small number of amplifiers.

In addition to the wavelength dependence, EDFA performance is also a function of the amplification power supplied to the EDFA. Thus, EDFAs generally must be operated with a limited power range to minimize amplification variations in the system. The amplifier power limitations, in turn, increase the number of amplifiers in a system by limiting the allowable distance between EDFAs, i.e., the span length.

In discussing the signal intensity variation of EDFAs and other devices, the uniformity of gain or loss profiles over a wavelength range is generally referred to as the flatness of the profile. A perfectly flat profile is a gain, loss, or transparency profile that has a constant value over the wavelength range of interest.

WDM system constraints imposed by EDFA wavelength variations have focused attention on providing EDFA configurations that compensate for the variations and provide more uniform gain for a larger band of wavelengths and over a greater power range. Various EDFA configurations have been proposed to minimize amplifier gain variations. For example, see U.S. Pat. Nos. 5,406,411, 5,541,766, 5,557,442, 5,636,301, and 5,696,615; Sugaya et al., Optical Amplifiers and Their Applications, Technical Digest OSA 1995 v. 18, pp. 158–161/FC3-1; Jacobovitz-Veselka et al., Optical Amplifiers and Their Applications, Technical Digest OSA 1995 v. 18, pp. 162–165/FC3-1; Park et al., Electronics Letters, Mar. 5, 1998, Vol. 34, No. 5, Online No. 19980346; and, Dung et al., Electronics Letters, Mar. 19, 1998, v. 34, n. 6, Online No. 19980446.

Other amplifier configurations have used EDFAs in combination with a Raman amplifier to statically vary the gain profile of an EDFA. For example, see Masuda et al., OSA 1997, pp. 40–3/MC3-1, Masuda et al., Electronics Letters, v34, n13, Online No. 19980935 (Jun. 25, 1998), and U.S. Pat. No. 5,083,874 issued to Aida et al. It has also been proposed to eliminate EDFAs and use amplifier configurations that employ only Raman amplifiers. However, the all-Raman configurations to date have not greatly improved the amplifiers gain flatness profile and may still require gain equalization to flatten the gain profile as discussed by Rottwitt et al., "A 92 nm Bandwidth Raman Amplifier", OFC '98, p. 72/CAT-1.

The above referenced gain flattened configurations are generally statically configured to have a wavelength range defined by a 3 dB variation (~ a factor of 2) in the gain profile and having a ±1 dB variation between wavelengths. The gain flattened amplifiers provide some improvement over conventional EDFAs in the number of amplifiers, amplifier power ranges, and span lengths before the signal must be regenerated. The gain flattened optical amplifiers nonetheless introduce excess amplifier noise and gain non-uniformities that limit the number of optical amplifiers that can be used in a WDM system prior to signal regeneration.

Gain flattening in optical amplifier configurations is generally performed using filters and/or attenuators to decrease the signal intensity of the wavelengths to a specified value. For example, in many embodiments, the optical signals are amplified to an intensity higher than the amplifier output value and the filters and attenuators are used to flatten the gain profile by decreasing the optical signal intensity. These methods tend to increase the noise in the signal with a corresponding decrease in the output power of the device.

Optical filters and attenuators are often included as separate optical devices in the system, but may also be allfiber devices, such as Bragg grating filters and all-fiber attenuators, included in the transmission fiber. For example, see U.S. Pat. Nos. 4,728,170, 5,095,519, 5,633,974, 5,651,085, and 5,694,512. The filters and attenuators can be variable or fixed depending upon the configuration. The amplifier, filters, and attenuators are statically configured to flatten the gain profile.

As the demand for transmission capacity continues to grow, there is an increasing need for systems that span longer distances and provide a greater number of information carrying wavelengths/channels. However, it has proven difficult to balance the non-linear gain of EDFA configurations with selective wavelength filtering and attenuation to provide gain flattened amplifier configurations that meet this need.

Accordingly, there is a need for optical amplifiers and attenuator particularly, and signal varying devices generally, that provide increased control over the spectral intensity profile of optical signal in the optical systems. The improved signal varying devices will provide for higher capacity, more versatile, longer distance communication systems.

BRIEF SUMMARY OF THE INVENTION

The apparatuses and methods of the present invention address the above difficulties with prior art optical devices and systems. An optical system of the present invention includes a plurality of optical processing nodes in optical communication via at least one signal varying device. The signal varying devices includes an optical fiber suitable for facilitating Raman scattering/gain in a signal wavelength range and a pump energy source for providing pump energy in a plurality of pump wavelengths. The pump source provides sufficient pump energy in each pump wavelength to stimulate Raman scattering/gain in the optical fiber within the signal wavelength range.

The signal varying device can be embodied as a distributed device that employs a portion or all of an optical transmission fiber extending between two optical nodes, such as between an optical transmitter and an optical receiver. The signal varying device can also be embodied as a lumped or concentrated device that is placed in the optical transmission fiber at discrete locations between the optical nodes.

The pump wavelengths are selected such that the combined Raman gain resulting from the pump energy supplied by each pump wavelength produces a desired signal variation profile in the signal wavelength range. In addition, the pump energy supplied by at least one of the pump wavelengths can be dynamically varied to produce a controlled signal intensity variation profile over the signal wavelength range in the optical fiber. In an embodiment, four pump wavelengths spaced in 10–30 nm intervals can be used to provide intensity gain and flatness control to over 30 nm to within ±0.2 dB.

Also in an embodiment, erbium doped fiber is included in the signal varying device to provide a multiple stage signal varying device. The erbium doped fiber and the multiple wavelength controlled Raman portion of the signal varying device can be operated in conjunction to impart a desired intensity profile to the optical signal.

The design and length of the optical fiber used in conjunction with the pump source can be tailored to provide flexibility in operation of the system. For example, a concentrated, or lumped, high gain signal varying device can be provided using a small core fiber, such as dispersion compensated or dispersion shifted fiber. The lumped device further provides for a greater range over which the signal varying device can be used as an attenuator because of its higher localized loss.

Multistage concentrated and/or distributed Raman signal varying devices can also be employed to further tailor the profile using either separate or common pump sources. For example, a first concentrated Raman stage can employ small core fiber to provide for efficient Raman amplification of the signal wavelengths. A second concentrated Raman stage can employ a larger core fiber to further amplify the signal power, while lessening the extent of non-linear interactions amongst the signal wavelengths that may occur in a single stage with smaller core fibers. The second concentrated Raman stage can also employ fiber having low loss in the 1400–1520 nm range to allow for more efficient Raman pumping of the multiple stages using a common source. In addition, the first and second Raman stages can use fibers that have different chromatic dispersion characteristics to further reduce the extent of non-linear interaction between the signal wavelengths.

Distributed signal varying devices can be provided by employing the optical transmission fiber spanning between the optical nodes to control the signal variation profile occurring in the transmission fiber. Also, different optical fiber types, including doped fibers, can be used in various portions to replace existing transmission fiber to provide for different distributed signal varying profiles. The concentrated and distributed Raman signal varying devices can be used alone or in combination to statically or dynamically impart desired signal varying profile characteristics to the system.

In an embodiment, a distributed Raman amplifier can be employed with one or more first pump sources propagating pump energy in the transmission fiber to amplify counter-propagating signal wavelengths to provide a first signal varying profile. A concentrated Raman signal varying device can be placed in series with the distributed Raman amplifier employing one or more second pump sources to provide a second signal varying profile. The first and second signal varying profiles acting to produce a desired overall signal varying profile. Additionally, an EDFA can be employed to contribute a third signal varying profile to the overall signal varying profile.

A distributed Raman amplifier can also be used to provide pump energy to one or more remotely located concentrated or distributed Raman amplifiers and/or doped amplifying fibers. For example, the pump sources can be selected to produce a first signal varying profile in the distributed Raman amplifier and a second signal varying profile in the remotely located erbium doped fiber. The pump power and/or the wavelength of the pump energy sources can be varied to control to individual and overall signal varying profiles. Pump energy can also be supplied to remotely located signal varying devices using one or more separate fibers. Such fibers can be pure $SiO_2$ to minimize loss and nonlinear conversion of the pump light.

Additional gain and gain profile control in Raman amplifier stages can be produced by including one or more pumps at lower Raman wavelengths that serve to provide additional pump energy to the higher Raman pump wavelengths. The pump source can employ numerous configurations to decrease the extent of interference, i.e., cross-talk, that occurs between the Raman pump wavelengths, as well as the signal wavelength.

Thus, the devices and methods of the present invention provide for control of the signal intensity over a range of wavelengths in optical transmission systems. Accordingly, the present invention addresses the aforementioned problems and provides signal varying devices, methods, and optical systems that provide increased control over optical signal characteristics in the system. These advantages and others will become apparent from the following detailed description.

BRIEF DESCRIPTION OF THE DRAWINGS

Embodiments of the present invention will now be described, by way of example only, with reference to the accompanying Figures wherein like members bear like reference numerals and wherein:

FIG. 8 shows exemplary overall, distributed Raman, and remote erbium gain profiles using remote pumping embodiments of the present invention;

FIGS. 9–10 show alternative pump combining configurations of the present invention;

FIGS. 11(a&b) show (a) Raman gain profiles over a 30 nm range as a function of gain and (b) various Raman gain profiles; and, FIGS. 12–13 show Raman gain profiles over 35 and 100 nm, respectively, based on a summation of experimental data using single pump wavelength signal varying devices.

DETAILED DESCRIPTION OF THE INVENTION

The optical systems 10 of the present invention will be described generally with reference to the drawings for the purpose of illustrating present embodiments only and not for purposes of limiting the same.

Figure 1:
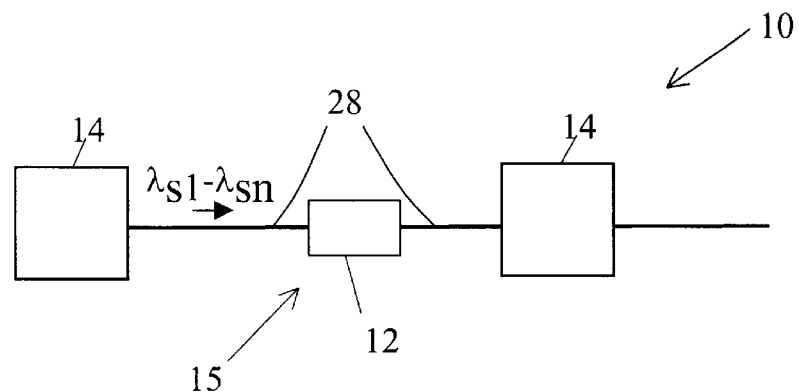
FIGS. 1–2 shows optical communication systems of the present invention.
Figure 2:
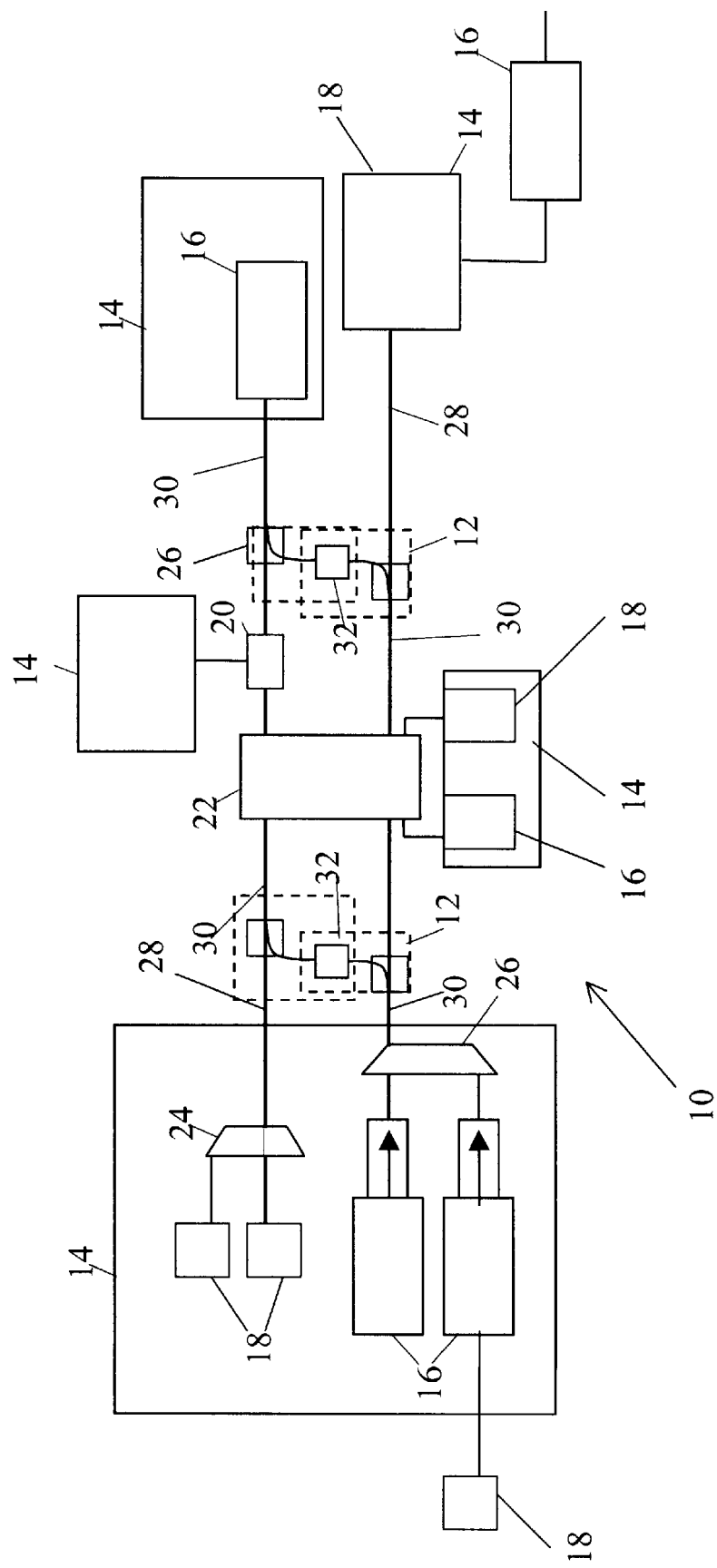

FIG. 1 shows an optical system 10 including a signal varying device 12 optically connecting two optical processing nodes 14 to form an optical link 15. As shown in FIG. 2, the optical processing nodes 14 generally include at least one transmitter 16 for transmitting optical signals in at least one information carrying wavelength, or channel, or at least one optical signal receiver 18 for receiving the optical signals.

As is known in the art, the transmitter 16 includes at least one optical source or emitter, such as lasers, incoherent sources, or other sources to provide one or more optical carriers at fixed or tunable wavelengths. The information to be transmitted in the system 10 can be used to directly modulate the source or externally modulate the optical carrier, or can be upconverted onto an optical wavelength other than the optical carrier wavelength.

Likewise, the receiver 18 can employ direct or indirect, e.g. coherent, detection equipment, such as photodiodes and wavelength selective devices as are known in the art, to receive and perform an opto-electronic conversion of the signal. Similarly, the optical receiver 18 can detect a fixed or tunable wavelength depending upon the requirements of the system 10. The optical processing nodes 14 may further include add and/or drop ports 20, switches 22, signal distributors 24 and combiners 26, or other signal processing devices as are further known in the art.

The optical system 10 may include a plurality of optical links 15 interconnected via the optical processing nodes 14 and/or signal varying devices 12. The optical processing nodes 14 can serve as terminals in the optical system 10 or may be disposed intermediately along optical transmission fiber 28 interconnecting the nodes 14 and devices 12.

As shown in FIG. 2, the signal varying device 12 includes a Raman gain section of transmission fiber 30 in optical communication with the processing nodes 14, which is supplied with pump energy by a pump energy source 32. The signal varying device 12 can be embodied as a distributed device in which the Raman gain transmission fiber 30 includes a substantial portion or all of the optical transmission fiber 28 extending between nodes 14, such as a optical transmitter 16 and optical receiver 18, and/or devices 12. The signal varying device 12 can also be embodied as a lumped, or concentrated, device that is placed in the optical transmission fiber 28 at discrete locations between the optical nodes 14.

One skilled in the art will appreciate that concentrated devices 12 of the present invention can be produced in a manner analogous to prior art EDFA construction. For example, the concentrated devices 12 are constructed by winding optical fiber of sufficient length to provide the desired signal variation range, such as amplification, within a discrete device around a spool to control the size of the devices 12.

Figure 3:
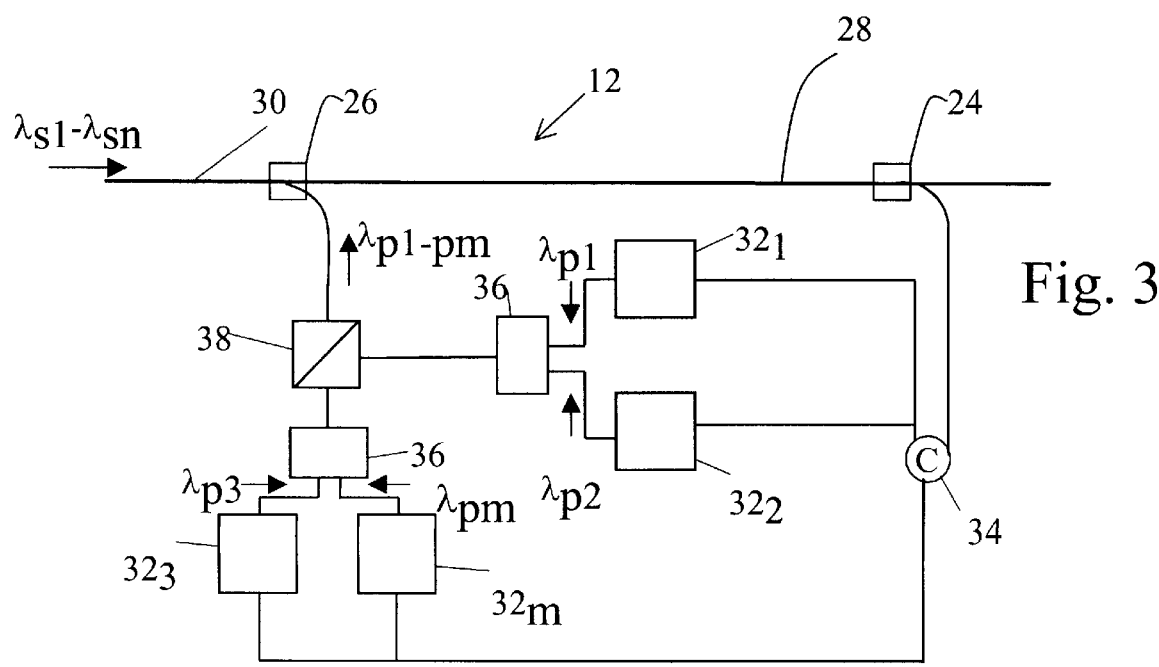
FIGS. 3–5 show signal varying devices of the present invention.

As shown in FIG. 3, a controller 34 can be included in the device 12 and configured to dynamically control the pump energy supplied via one or more of the pump wavelengths. Dynamic control of the pump energy allows for the performance of the device 12 to be varied as signal transmission changes occur, either upstream and/or downstream of the device 12. Thus, the dynamic control provides the ability to continually or periodically modify the operation of the devices 12 in response to communication system/ environmental variations that inevitably occur with time. The devices 12 allow the signal varying profiles to be controlled both on-line or off-line, such as during installation, maintenance, grooming, etc.

In one aspect of the invention, the pump source 32 is configured to combine arbitrarily spaced pump wavelengths as shown in FIG. 3. Grating stabilized lasers $32_m$ can be used to provide pump wavelengths that are combined in pairs using fused DWDM couplers 36. The paired pump wavelengths can be further combined with arbitrarily spaced pump wavelengths using a dichroic filter 38. Alternatively, polarization combiners 39 can be used to combine two pump wavelengths having orthogonal polarizations, which can be further combined with other wavelengths using the dichroic filter 38. The use of polarization combiners 39 provides additional control over the pump energy polarization and the resulting pump energy conversion in the Raman amplifiers.

The combination of fused couplers 36, dichroic filter 38, and polarization combiners 39 in the present invention provides increased flexibility in wavelength combining and amplfier gain profile control. It will be appreciated that additional wavelengths can be added by cascading the lasers and wavelength combining arrangements.

The pump energy is introduced into the optical transmission fiber 28 using combiners 26, such as wavelength division multiplexers. Other wavelength selective or nonselective couplers, circulator, reflectors, and other combining device known in the art can be used to introduce the pump energy.

In the present invention, the Raman gain optical fiber 30 can be selected to facilitate Raman scattering/gain over a range of transmission signal wavelengths that include optical signal wavelengths $\lambda_{s1}-\lambda_{sn}$, when the fiber 30 is stimulated using pump energy provided in a pump wavelength range. Most silica-based fiber, including most transmission fibers, facilitate Raman gain in a wide range of wavelengths; thus, additional fiber 30 included in the device 12 is generally selected to complement any existing fiber as will be further discussed. With proper pump wavelength selection, it is expected that Raman gain can be provided across the optical fiber transparent transmission wavelength range, which currently ranges from approximately 1240 to 1650 nm for silica based fiber.

For example, in the transmission signal wavelength range of 1520 nm to 1620 nm, the corresponding pump wavelength range is approximately 1420 nm to 1520 nm. Likewise, in the transmission signal wavelength range of 1250 nm to 1350 nm, the corresponding pump wavelength range is 1150 nm to 1250 nm. Thus, more than one signal wavelength range can be transmitted in the optical system 10. The signal wavelength ranges can be interleaved with the pump wavelengths to provide a multiple signal wavelength range system as stated above. It is also expected that changes in the optical fiber transmission signal wavelength range can be accommodated by the present invention by proper selection of pump wavelengths.

Devices 12 having different signal variation profiles and employing different pump wavelengths can be used in combination within the system 10. The optical fiber 30 used in the signal varying device 12 can be the same as the transmission fiber 28 in the system 10 or another type of optical fiber having different properties. The length and type of fiber deployed in the system 10 can be tailored to provide flexibility in the operation of the system.

For example, the extent of Raman scattering in the fiber is partly dependent upon the size of the optical fiber core. In addition, the loss in the fiber increases as the size of the core decreases. Thus, a concentrated, or lumped, high gain/loss signal varying device can be provided using a small core fiber. Also, some fiber core composition, such as cores with increased germania concentrations, can provide for wider Raman gain variation profiles. In addition, fibers can be chosen to impart other characteristics, i.e., chromatic dispersion, to the optical signals that may differ from those of the transmission fiber.

In at least one embodiment, a small core dispersion compensating fiber ("DCF"), such as is manufactured by Lucent Technologies or Sumitomo Electric Company, is used as the Raman gain fiber in a concentrated signal varying device 12. The DCF concentrated device 12 provides for a greater range over which the signal varying device can be used as an attenuator, an amplifier, or a transparent link, because of the high attenuation/high gain properties of the DCF. Conversely, standard single mode transmission fiber can used to provide a distributed lower gain signal varying device 12 to provide control over a smaller intensity variation (gain/loss) range.

Figure 4:
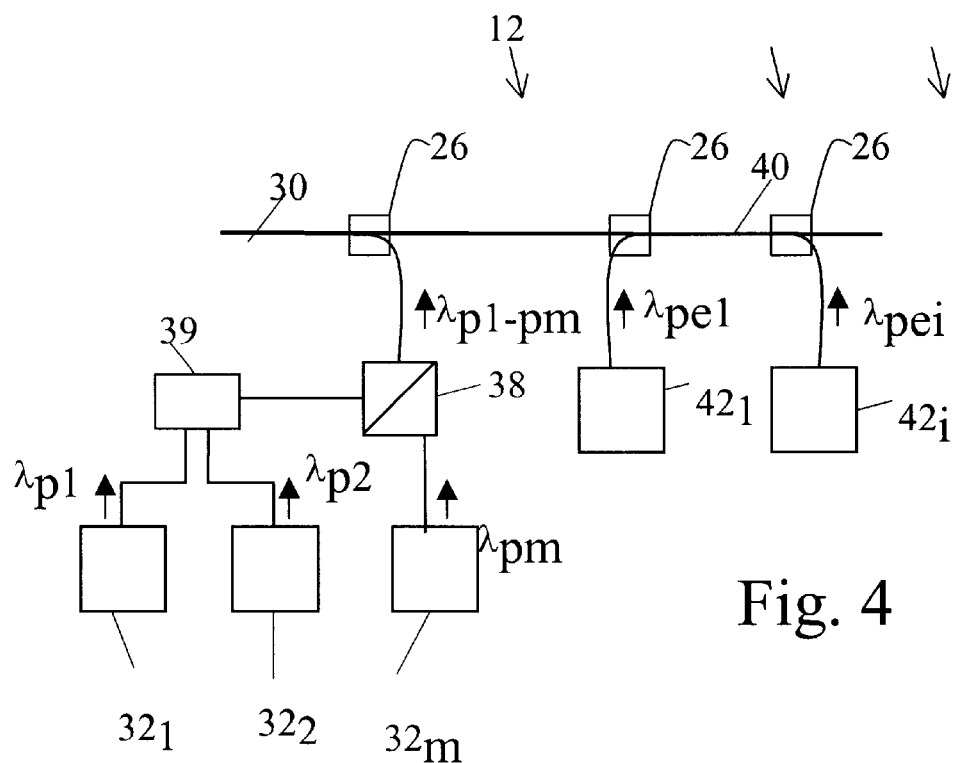

Non-linear intensity profiles can be also provided using the device 12. The device 12 can include inherently nonlinear or nonlinearly operated components, such as one or more doped fiber amplifiers, etc., to produce a net linear intensity profiles or different non-linear profiles. For example, an erbium doped fiber 40 can be included in the transmission fiber and optically pumped using wavelengths, $\lambda_{pe1}-\lambda_{pei}$, supplied by one or more erbium pump sources $42i$. The erbium doped fiber 40 can be embodied as a distributed or concentrated portion in combination with the Raman section of the signal varying device to provide a multiple stage signal varying device 12, as shown in FIGS. 4 and 5. It will be appreciated that various EDFA configurations, such as those discussed in the Background, can be used in embodiments incorporating erbium doped fiber.

Devices 12 having multiple concentrated/lumped Raman stages can be introduced into the transmission fiber 28 to further tailor the signal varying profile. For example, a first concentrated Raman fiber stage $12_1$ can employ a small core fiber, such as DCF, to provide for efficient Raman amplification of the signal wavelengths. A second concentrated Raman fiber stage $12_2$ can employ a larger core fiber to provide additional signal amplification, while lessening the extent of non-linear interactions compared to smaller core fibers. The second concentrated Raman stage can also employ fiber having low loss in the 1420–1510 nm range, such as AllWave fiber sold by Lucent Technologies. The use of low loss fiber provides increased pumping efficiency, so that both stages can be more effectively pumped using a common Raman pump source. Alternatively, the pump source 32 can be configured to provide different Raman pump wavelengths to pump the first and second stages.

In addition, the first and second Raman stages can use fibers that have different chromatic dispersion characteristics. The change in fiber dispersion characteristics will tend to reduce the extent of non-linear interaction that occurs between the highly amplified signal wavelengths.

Other optical components including gain profile varying components can be included in the devices 12. As shown in FIG. 5(b), wavelength selective reflectors 44, such as Bragg gratings, can be included to reflect excess pump energy back into optical fiber 30 or erbium sections 40. Gain flattening filters 46 can also be included to impart a fixed or variable gain profile on the optical signal. Optical isolators 48 are provided to eliminate discrete reflections from the gain flattening filter 46. Also, the device 12 can be provisioned to allow the local controller 34 to transmit and receive supervisory and/or monitoring, i.e., service, information from a network manager 50 via optical wavelength $\lambda_{sc}$ as shown in FIG. 5(b).

Also, it will be further appreciated that the devices 12 can be divided into multiple stages, i.e., pre- and post-amplifier stages. Signal processing, such as adding/dropping or switching channels, etc., and/or controlling accumulated noise and/or gain profile variations can be performed between the stages as is known in the art.

The pump energy source 32 provides pump energy to the fiber 30 in a plurality of pump wavelengths, $\lambda_{p1}$–$\lambda_{pm}$, within the pump wavelength range. The pump energy can be supplied to the fiber 30 counter-directionally and/or codirectionally with the optical signal wavelengths $\lambda_{s1}$–$\lambda_{sn}$ being transmitted in the system 10. Counter-propagating the first Stokes order Raman wavelengths relative to the signal wavelengths generally lessens signal degradation due to interference, i.e., cross-talk, between the pump energy and the optical signal. Also, the pump energy supplied via each pump wavelength can be controlled to compensate for any self-pumping that might occur between the pump wavelengths. It is also desirable to select pump wavelengths so that the pump energy supplied by each pump wavelength is relatively uniform, i.e., within ±10% of the average pump energy per pump wavelength.

Figure 5A:
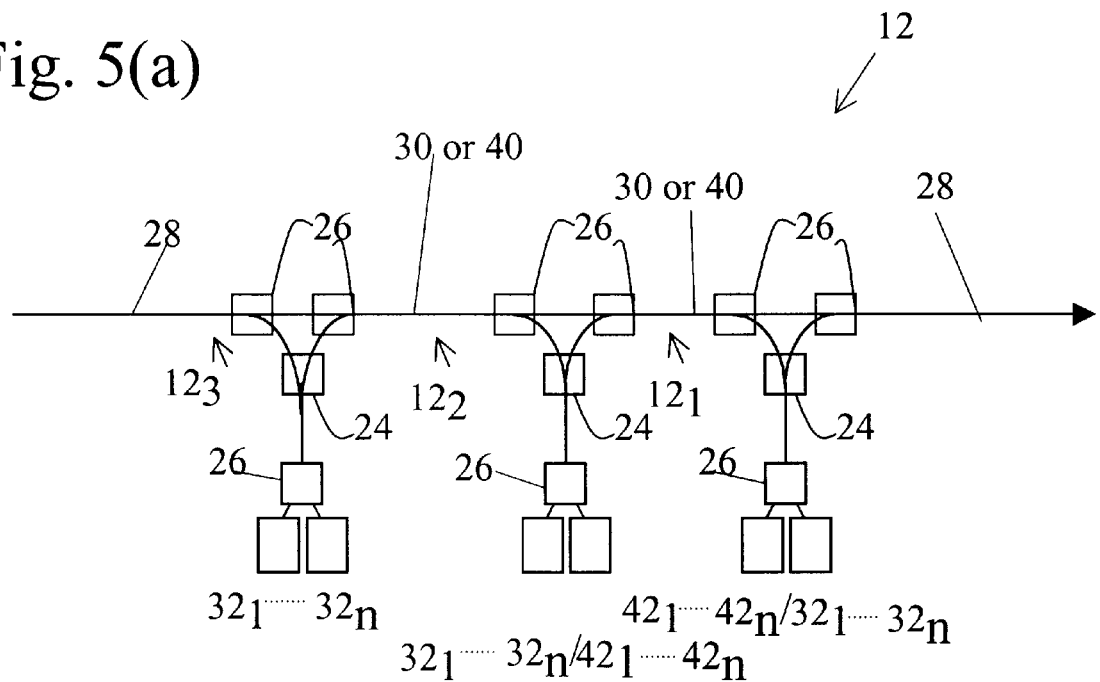
Figure 5B:
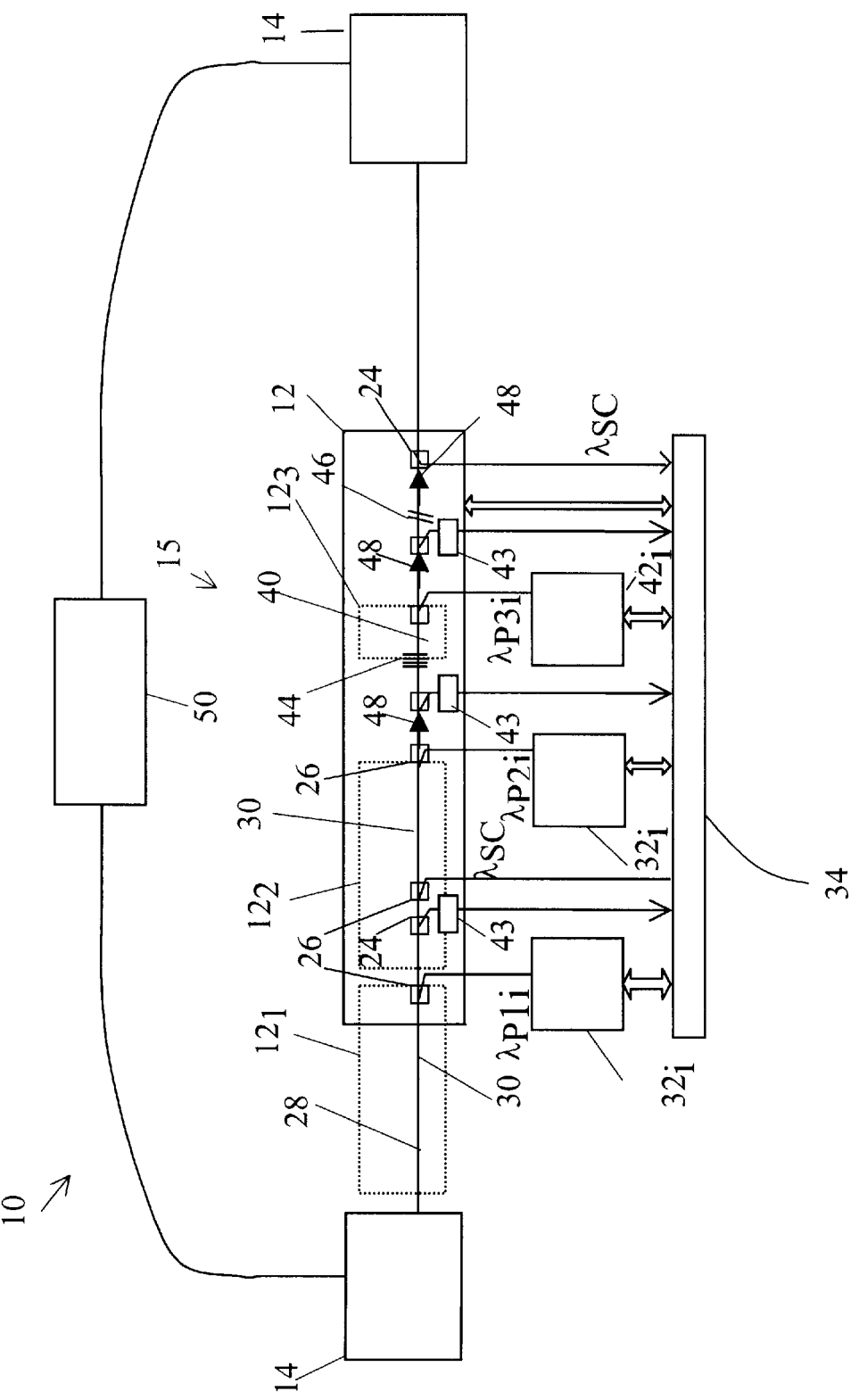

In addition, the pump source 32 can supply the pump energy at one or more points along the fiber 30 as shown in FIG. 5(a). In at least one embodiment, pump energy is separately supplied to each stage of the device 12 from a point on the fiber 30 and counter-directionally to the optical signals being transmitted.

The pump source 32 can be any source of pump energy that is sufficient to induce Raman gain in the transmission wavelength ranges of the system 10. Typically, the pump source 32 will include one or more pump lasers of the type known in the art, and may also include other coherent and incoherent broad and narrow band sources. The number of lasers and other pump energy sources used in the pump source $32^M$ depends upon the transmission wavelength ranges over which the signal varying device 12 will be operated.

The pump wavelengths used in erbium fiber stages of the devices 12 can be selected to provide pump energy in the 980 nm range for only erbium gain or in the 1480 nm range for both Raman and erbium gain. One will appreciate that pump wavelengths in the 980 nm range may be used to provide Raman gain by pumping successive Stokes orders in the device 12, as discussed within.

Figure 6:
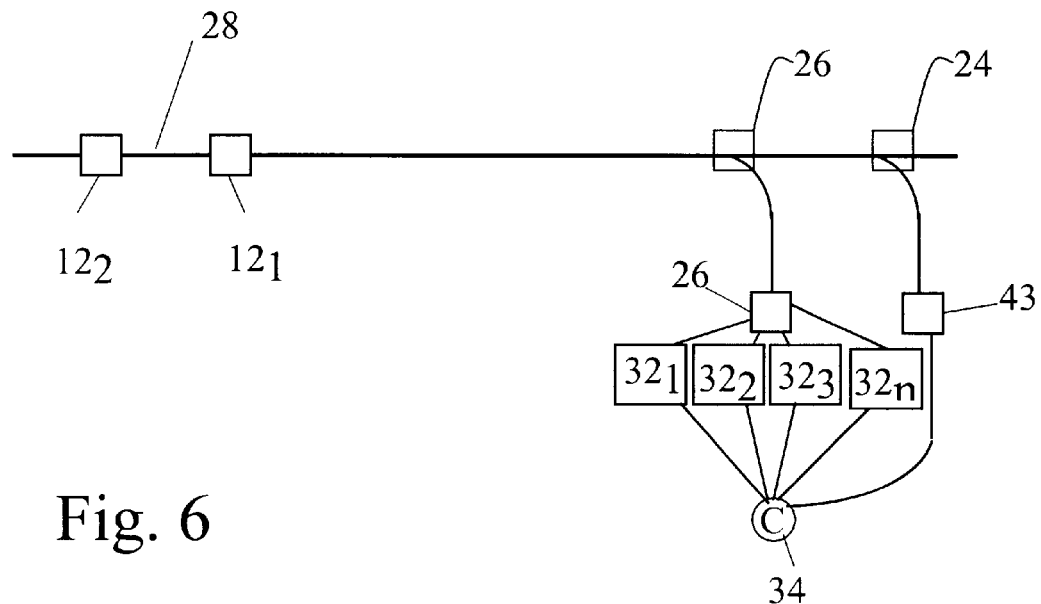
FIGS. 6–7 show remote pumping embodiments of the present invention.
Figure 7:
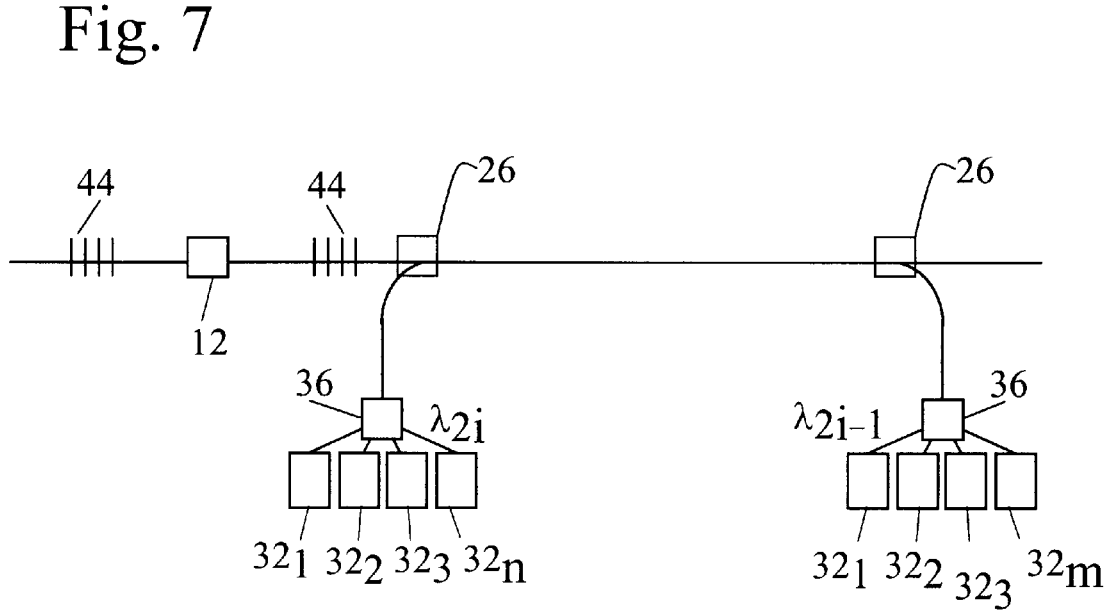

The pump sources 32 may be locally or remotely located from the signal varying device, such as shown in FIGS. 6 and 7. The signal varying devices 12 can be configured such that the residual pump energy from a distributed Raman amplifier is supplied to pump one or more concentrated or distributed Raman and/or doped fiber signal varying devices 12. For example, sections of the transmission fiber are replaced with corresponding sections of doped fiber and/or different types fiber to provide distributed signal varying devices 12. In these configurations, residual pump energy from the distributed Raman amplifier can be used to pump and control the signal variation profiles of the remotely distributed devices 12.

FIG. 8 shows a plot of the signal variation profiles using the transmission fiber 28 to form a distributed Raman amplifier, which provides pump energy to a remotely located section of erbium fiber 40 spliced into the transmission fiber 28. Curve A shows the remote erbium gain profile. Curves B and C show the target and acheived Raman gain profile. Curve D shows the overall gain profile for the erbium and the Raman gain section. As can be seen, the pump wavelengths and energy provided by the pump source 32 can be selected to provide complementary non-linear gain profiles in the transmission fiber 28 and the erbium fiber 40. The resulting overall profile is substantially uniform. As would be expected the overall profile can be varied to provide other profiles as may be desired. For example, the gain profile can be tilted to offset higher bending losses at longer wavelengths.

As shown in FIG. 6, a portion of the optical signal, including the signal wavelengths, can be tapped off the transmission fiber 28 for analysis. Characteristics of the signal wavelengths can be determined using an analyzer 43, such as an optical spectrum analyzer and a tunable receiver 18 and bit error rate test device. The signal characteristics can used by the controller 34 to vary pump energy supplied by pump sources $32_1$–$32^m$ to maintain a desired profile/system performance. The variation in pump energy will change the overall signal varying profile by varying profiles of both the remote signal varying device 12 and the distributed Raman amplifier supplying the remote devices 12.

In addition, one or more wavelength selective reflectors 44 can be disposed proximate to the remote signal varying device 12. Thus, excess pump energy can be reflected to provide additional gain in the distributed Raman section and/or the remote signal varying devices depending upon the position of the reflectors 44.

As further shown in FIG. 7, additional gain and gain profile control in Raman amplifier stages and remotely pumped doped fiber stages can be produced by including one or more pumps at higher Stokes order Raman wavelengths to amplify lower Stokes order Raman pump wavelengths. In Raman amplifiers, the pump energy attenuates with distance traveled in the fiber reaching a level at which very little Raman amplification of the signal wavelengths occurs. However, pump energy at higher Stokes order Raman wavelengths (1320–1420 nm, etc.) can be introduced into the fiber to amplify the lower Stokes order Raman wavelengths (1420–1520 nm, etc.), which, in turn, will amplify the signal wavelengths (1520–1620 nm, etc.). If co-propagating Raman wavelengths are staggered by at least every other Raman wavelength and adjacent Stokes orders are counter-propagated, cross-talk between the wavelengths should not greatly affect the signal wavelength.

An exemplary Raman wavelength pump arrangement is shown in FIG. 7. Pump lasers $32_n$ supply Raman wavelengths in the Stokes orders ($2i$–1) counter-propagating to the signal wavelength range and Raman wavelengths in the Stokes orders $2i$ co-propagating with the signal wavelengths for values of i from 1 to an arbitrary value. For a signal wavelength in the 1520 to 1620 nm range, the first and second Raman wavelength ranges would be 1420–1520 nm and 1320–1420 nm, respectively, which corresponds to i=1.

In some embodiments, information can be transmitted on a wavelength in one direction, while providing pump energy in the same wavelength in the other direction. For example, in newer fibers that have lower loss in the 1400 nm range, information could be transmitted in one direction at 1450 nm and pump energy supplied for Raman gain in the 1550 range in the other direction. When allocating the same wavelength for use in both directions, consideration must be given to potential signal degradation due to Rayleigh back-scattering.

The pump wavelengths in the various Stokes' orders are selected such that the combined Raman gain resulting from the pump energy supplied by each pump wavelength produces a desired Raman gain signal variation profile in the signal transmission wavelength ranges. The Raman gain signal variation profile can be uniform or nonuniform, linear or nonlinear depending upon a particular application of the device 12. In wide band optical systems, i.e., signal wavelength range >30 nm, the signal varying profile of the devices 12 can be used to compensate for loss variation of the signal wavelengths, such as bending loss variations, etc.

The number of pump wavelengths and the wavelength spacing used in the device 12 can be varied to provide Raman gain over a range of wavelengths. The pump wavelengths, $\lambda_{p1}$–$\lambda_{pm}$, are generally selected to provide sufficient overlap of the Raman gain profiles to provide control over the Raman gain at one or more wavelengths in the transmission signal wavelength range.

In addition, the pump energy supplied by at least one of the pump wavelengths can be controllably varied to change the signal variation profile over the wavelength range in the optical fiber. Also, the total pump energy supplied via all the pump wavelengths can be held constant or varied accordingly, while varying the pump energy provided by the individual pump wavelengths. One skilled in the art will appreciate that the choice of wavelength can be made to tailor the signal varying characteristics of the device 12 to a particular system configuration.

Typically, the pump wavelengths, $\lambda_{p1}$–$\lambda_{pm}$, are selected so that overall signal variation profile will be substantially uniform over the range of wavelengths. One skilled in the art will appreciate that decreasing the spacing intervals of the pump wavelengths can provide increased control over the uniformity of the intensity profile. For example, pump energy could be supplied in narrow spectral ranges to maximize the gain in the signal wavelengths will minimizing the gain of the noise wavelength between the signals. However, the increased uniformity and control must be balanced with the increased cost of using additional wavelengths in the device 12 and allowable total power requirements. Conversely, a broadband optical source can be employed to provide pump energy over a broad spectral range of wavelengths, thereby minimizing the required number of pumps.

Figure 9A:
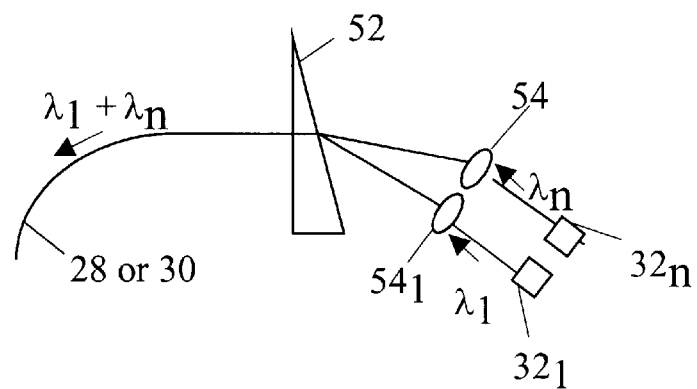
Figure 9B:
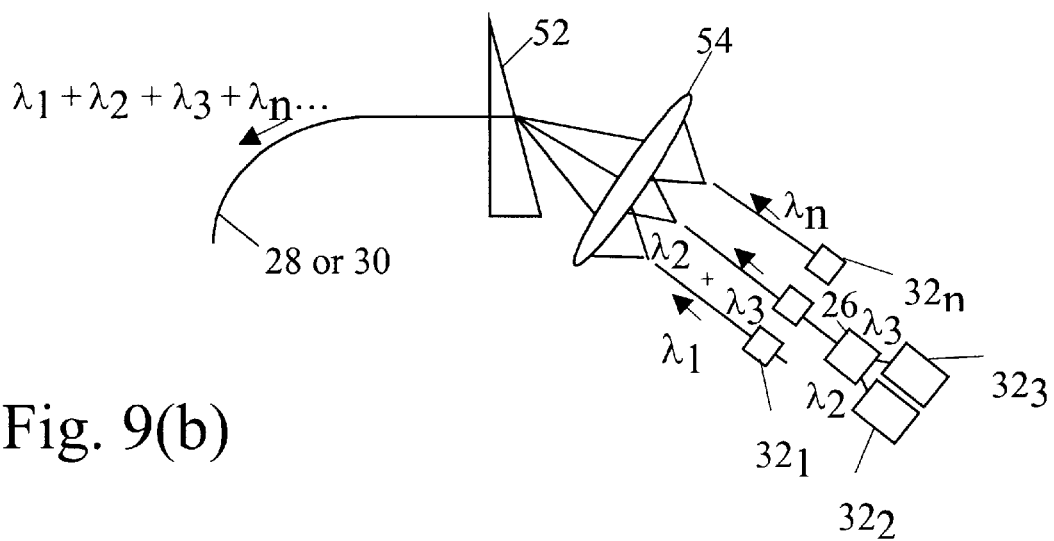

When a plurality of pump wavelengths are used, it is generally necessary to employ cascaded combining arrangement. As the number of cascaded combining arrangements is increased or the range of wavelengths is varied, it may become necessary to employ other arrangements to reduce the loss associated with combining the pump energy. Such alternatives can include prism 52 and lens 54 combiners or circulator 56/grating 44 multiplexers, such as shown in FIGS. 9 and 10. FIGS. 9(a&b) show the use of a single prism 52 to combine a plurality of pump wavelengths. The plurality of pump wavelengths are focused using either one or more lenses 54 at appropriate angles into the prism 52, which combines the plurality of pump wavelengths into a single beam that is output into optical fiber 30 in the device 12 or the transmission fiber 28. The difference in the angles of incidence is determined based on the refractive indices of the prism for each wavelength.

The difference in the refractive indices for each wavelength can be used to calculate the angle of incidence on the prism for each wavelength. The index of refraction in the prism is calculated as:

$n(\lambda)=(A+B\lambda^2/(\lambda^2-C)+D\lambda^2/(\lambda^2-E))^{1/2}$ and $\theta(\lambda)(radians)=a\sin(n(\lambda)*\sin(\alpha))$, where $\alpha=22\pi/180$, $\theta$ is the refraction angle, $\lambda$ is the pump wavelength, and A–E are prism constants.

For example, a AgGaSe$_2$ prism (A–E=3.9362, 2.9113, 0.1507, 1.7954, 1600) can be used to combine two pump wavelengths at 1480 and 1470, respectively. The pump wavelengths are transmitted into the prism at angles which differ by approximately 0.136 degrees to produce a combined signal exiting the prism 52. One skilled in the art will appreciate that combining prisms 52 may also be cascaded similar to couplers and other multiplexing devices to combine additional pump sources.

Circulator 56 and grating 44, shown in FIG. 10, are typically more expensive than coupler arrangements. However, as the number of pump sources 32$_m$ is increased, the circulator/grating devices can reduce the loss associated with pump combining. The circulators 56 can be provided with a plurality of ports and corresponding gratings to combine the pump wavelengths. One or more circulators 50 can also be cascaded to provide for more efficient combining of the pump wavelengths.

The configuration shown in FIG. 3 was used to further demonstrate the advantages of the present invention. In one example, four pump wavelengths, 1450, 1460, 1485, and 1495 nm, were combined using two 10 nm DWDM couplers and a dichroic filter, which allows the unevenly spaced wavelengths to be effectively combined. The combined pump wavelengths were supplied to DCF to provide Raman gain in the transmission signal wavelength range of 1555 to 1585 nm.

As shown in FIG. 11(a), substantially flat Raman gain signal variation profiles (±0.16 dB) can be produced over a 30 nm range for gains ranging from 1 to 8 dB. In addition, the relative power of the pump wavelengths supplied to the device 12 can be varied to produce non-linear profiles that generally increase or decrease across the signal wavelength range, as shown in FIG. 11(b).

Figure 12:
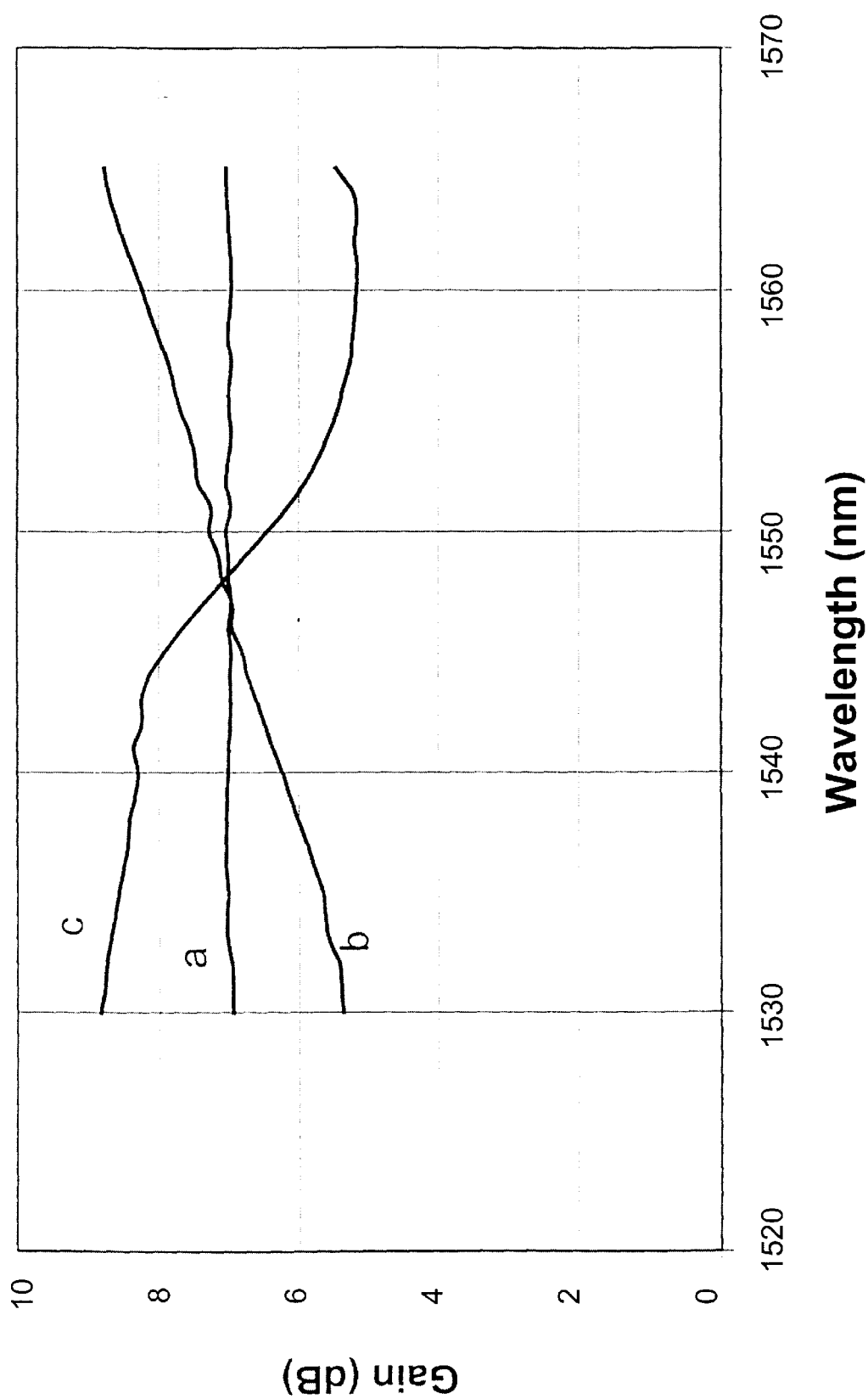
Figure 13:
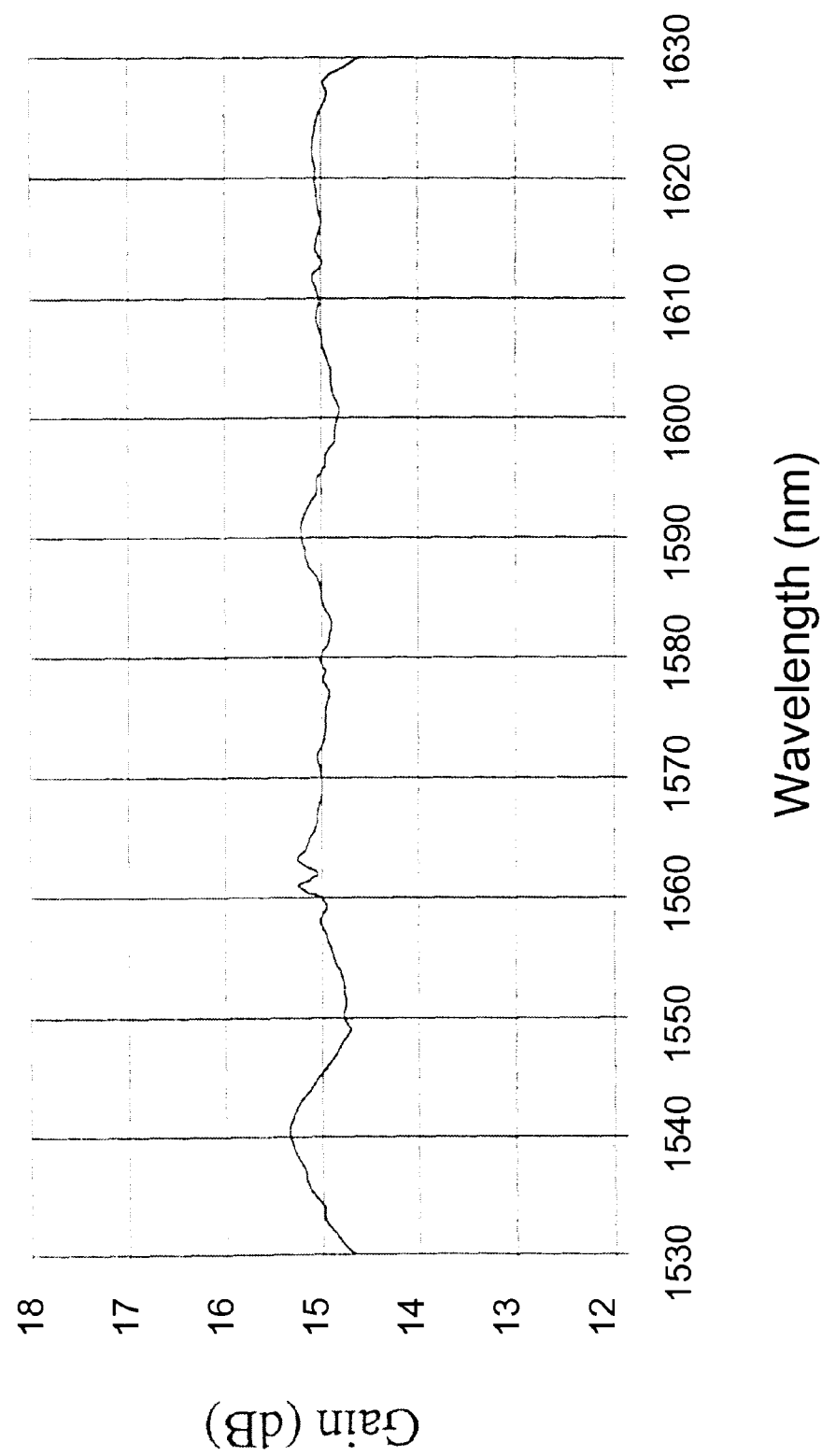

Experimental gain profiles were determined for a number of additional pump wavelengths. Based on the experimental results, Raman signal varying device simulations were performed over 35 nm wide (1530–1565 nm) and 100 nm wide (1530–1630 nm) signal wavelength ranges. The predicted performance of ±0.12 dB and ±0.342 dB over the 35 nm and 100 nm wavelength ranges, as shown in FIGS. 12 (curve a) and 13, respectively, indicates that the signal varying devices of the present invention can be used over a wide range of wavelengths to accommodate numerous channels. FIG. 12 (curves b and c) also shows examples of linear and non-linear profiles that can be produced by varying the relative power at the various pump wavelengths. It is also expected that the number of pumps and the pump wavelength spacing can be further varied to provide a range of signal variation profiles over wide and narrow wavelength ranges.

The signal varying devices 12 of the present invention can be operated in one, two, or three of the signal varying modes, amplification, attenuation, and lossless. By controlling the pump power, one signal varying device can be continuously transitioned between the three modes of operation. In addition, the intensity gain/loss profile can be adjusted in each signal varying device 12 to dynamically control the characteristics of the optical signals exiting the signal varying device 12. It is also possible to operate the signal varying device 12 in more than one mode at the same time. For example, the signal varying device 12 can be operated as an amplifier over part of the signal wavelength range and as an attenuator and/or a lossless link over the remaining part of the signal wavelength range. The multiple mode operation of the signal varying device 12 can be used to compensate for optical signals that enter the signal varying device 12 with a non-linear intensity profile.

Different signal varying devices 12 can be included in the system 10 that are operated with different pump wavelengths and powers to provide a cumulative signal variation profiles differing from the signal variation profiles of each device 12. For example, the pump wavelengths used in different devices 12 can be varied to compensate for individual device signal variation profile nonuniformities and provide a cumulative signal variation profile that is substantially more uniform than the individual device profiles.

Devices 12 of the present invention provide flexibility in the control of the optical system 10, because the power level, i.e. amplification and/or attenuation level, can be varied without changing the signal varying profile. Control of the individual devices can be performed as is known in the art. Alternatively, the devices 12 along the transmission fiber 28 can be controlled as one or more groups to provide additional stability in the system 10. An example of such an optical control systems is disclosed in commonly assigned U.S. patent Application Ser. No. 09/119,561, which is incorporated herein by reference.

Unlike prior art systems, the present invention does not require that a number of non-linear devices be coordinated and controlled to provide linear intensity variation (gain/loss) profiles. Instead, the present invention provides an optical system incorporating a continuous transition signal varying device that provides increased control over the characteristics of optical signals being transmitted in the system.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical signal varying device comprising:
an optical fiber for transmitting optical signals in at least one signal wavelength range and facilitating Raman gain in the at least one signal wavelength range; and,
a first pump source configured to provide pump energy to said optical fiber in a first set of Raman wavelengths including a plurality of pump wavelengths having sufficient pump energy to controllably produce Raman gain and signal variation profiles over the at least one signal wavelength range and a second pump source configured to provide pump energy in at least a second set of Raman wavelengths to provide Raman gain in the first set of Raman wavelengths in said optical fiber, wherein the pump energy is adjusted to provide Raman amplification, attenuation, and lossless transmission within the signal wavelength range.

2. The device of claim 1 wherein said first pump source is configured to vary at least one of the pump energy carried by at least one of said pump wavelengths and at least one of the pump wavelengths to control the signal variation profiles.

3. The device of claim 1 wherein said first and second pump source includes pump wavelengths selected to provide a substantially uniform signal variation profile over the signal wavelength range.

4. The device of claim 1 wherein said optical fiber includes at least one doped optical fiber section ranges remotely located from said first pump source and suitable for amplifying optical signals in at least one signal wavelength; and,
said first pump source is configured to supply pump energy in pump wavelengths to provide Raman gain in said optical fiber and optically amplify optical signals in said doped fiber.

5. The device in claim 4 wherein said first pump source includes pump wavelengths selected to provide an adjustable overall gain profile over the at least one signal wavelength range.

6. The device in claim 4 wherein said optical fiber includes at least a portion of transmission fiber in an optical transmission system.

7. The device in claim 4 wherein said first pump source includes pump wavelengths selected to provide a substantially uniform overall gain profile over the signal wavelength range.

8. The device in claim 4 wherein said first pump source includes pump wavelengths selected to provide different Raman and doped fiber gain profiles over the at least one signal wavelength range.

9. The device of claim 4 wherein said doped fiber includes at least one erbium doped fiber.

10. The device of claim 9 wherein said first pump source is controllable to provide a Raman gain profile that substantially compensates for gain non-uniformities introduced by said at least one erbium doped fiber.

11. The device of claim 4 further comprising at least one wavelength selective reflector positioned to reflect a portion of the pump energy from at least one pump wavelength back toward said first pump source.

12. The device of claim 11 wherein said at least one wavelength selective reflectors includes at least one fiber Bragg grating positioned to reflect the portion of the at least one pump wavelength before reaching said doped fiber.

13. The device of claim 10 wherein said first pump source is configured to supply pump energy in at least one wavelength that is not absorbed by said doped fiber and to provide Raman gain in said optical fiber.

14. The device of claim 1 wherein said first pump source is remotely located from said optical fiber and delivers the pump energy to said optical fiber via a separate pump path.

15. The device of claim 1 wherein said optical fiber includes first and second Raman fiber, said first Raman fiber having different Raman gain characteristics than said second optical fiber; and,
said first pump source is configured to provide pump energy in Raman wavelengths to said first and second Raman fibers.

16. The device of claim 1 wherein said first Raman fiber includes optical fibers having a smaller core than said second Raman fiber.

17. The device of claim 16 wherein said first pump source is configured to provide a common source of pump energy to said first and second Raman fibers.

18. The device of claim 17 wherein said second Raman fiber provides for low loss in the 1420 to 1510 nm range and pump energy is transmitted through said second Raman fiber to said first Raman fiber.

19. The device of claim 16 wherein said first pump source is configured to provide different Raman pump wavelengths to said first Raman fiber and said second Raman fiber.

20. The device of claim 1 wherein said second set of Raman wavelengths is counter-propagated in said optical fiber relative to the first set of Raman wavelengths.

21. The device of claim 1 wherein said pump source includes a third set of Raman wavelengths to provide Raman gain to the second set of Raman wavelengths.

22. The device of claim 1 wherein a portion of said optical fiber provides for distributed Raman gain and another portion of said optical fiber provides for concentrated Raman gain.

23. The device of claim 22 further comprising a gain flattening filter positioned to impart a signal variation profile over at least a portion of at least one signal wavelength range.

24. The device of claim 1 wherein said first pump wavelengths are selected to provide a cumulative signal variation profile over the signal wavelength range having a variation of <±1 dB.

25. The device of claim 1 wherein the signal wavelength range includes at least a portion of 1240 nm to 1650 nm.

26. The device of claim 1 wherein said optical fiber is suitable for transmitting a plurality of signal wavelength ranges; and, at least one of said first and second pump sources is configured to provide a plurality of pump wavelength interleaved with the plurality of signal wavelength ranges and having sufficient pump energy to produce Raman gain in a plurality of signal varying profiles in the plurality of signal wavelength ranges.

27. The device of claim 1 including a controller configured to control the pump energy supplied by at least one of said first pump wavelengths to produce an adjustable signal variation profile over the wavelength range in said optical fiber.

28. The device of claim 1 wherein said first pump source includes pump wavelengths selected to control the overall gain profile over the signal wavelength range and each pump wavelength provides pump energy within ten percent of the average pump energy supplied by the pump wavelengths.

29. An optical transmission system comprising:

a plurality of optical processing nodes optically connected to pass optical signals between said processing nodes; and, at least one signal varying device positioned to vary the optical signals passing between said processing nodes, wherein said signal varying device includes an optical fiber suitable for transmitting optical signals in at least one signal wavelength range and facilitating Raman gain in the at least one signal wavelength range;

a first pump source configured to provide pump energy to said optical fiber in a first set of Raman wavelengths including a plurality of pump wavelengths having sufficient pump energy to controllably produce Raman gain and a plurality of signal variation profiles over the at least one signal wavelength range and a second pump source configured to provide pump energy in at least a second set of Raman wavelengths to provide Raman gain in the first set of Raman wavelengths in said optical fiber, wherein the pump energy is adjusted to provide Raman amplification, attenuation, and lossless transmission within the signal wavelength range.

30. The system of claim 29 wherein:

said at least one signal varying device is disposed along optical transmission fiber interconnecting said plurality of optical nodes;

said optical fiber includes:
a distributed Raman fiber including at least a portion of said optical transmission fiber,
a concentrated Raman fiber having a smaller core than said transmission fiber, and
an erbium doped fiber; and, said first pump source includes
a first Raman pump source configured to transmit pump energy counter-directionally to the optical signals and produce Raman gain and a first Raman signal varying profile in said distributed Raman fiber,
a second Raman pump source configured to transmit pump energy counter-directionally to the optical signals and Raman gain and a second Raman signal varying profile in said concentrated Raman fiber, and
a erbium pump source configured to provide optical gain and an erbium signal varying profile in said erbium doped fiber.

31. The system of claim 29 wherein said first pump sources are configured to provide pump energy to said fiber in a direction counter-propagating to the optical signal.

32. A computerized method of controlling signal variation in an optical fiber comprising:

providing an optical fiber suitable for transmitting optical signals in at least one signal wavelength range and facilitating Raman gain in the at least one signal wavelength range;

coupling a first pump source to the fiber to provide pump energy in a first set of Raman wavelengths including a plurality of pump wavelengths having sufficient pump energy to produce Raman gain in the optical signal according to a signal variation profile in the signal wavelength range and a second pump source configured to provide pump energy in at least a second set of Raman wavelengths to provide Raman gain in the first set of Raman wavelengths in said optical fiber;

monitoring characteristics of the optical signals in a signal wavelength range passing through the optical fiber; and, controlling the pump energy supplied by the at least one of the first and second pump sources in at least one of the pump wavelengths to vary the signal variation profile and Raman gain to provide Raman amplification, attenuation, and lossless transmission over the signal wavelength range in the optical fiber.

33. The device of claim 1, wherein said second pump source is positioned remotely from said first pump source.

* * * * *